US012673725B2

(12) United States Patent
Park

(10) Patent No.: US 12,673,725 B2
(45) Date of Patent: Jul. 7, 2026

(54) STEERING ACTUATOR APPARATUS FOR VEHICLE

(71) Applicant: HYUNDAI MOBIS CO., LTD., Seoul (KR)

(72) Inventor: Su Ju Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 1058 days.

(21) Appl. No.: 17/660,908

(22) Filed: Apr. 27, 2022

(65) Prior Publication Data

US 2023/0011733 A1     Jan. 12, 2023

(30) Foreign Application Priority Data

Jun. 30, 2021     (KR) ........................ 10-2021-0085523

(51) Int. Cl.
*B62D 15/02*          (2006.01)
*B62D 5/04*           (2006.01)

(52) U.S. Cl.
CPC ....... *B62D 15/0225* (2013.01); *B62D 5/0421* (2013.01); *B62D 5/0448* (2013.01); *B62D 5/0481* (2013.01)

(58) Field of Classification Search
CPC .............. B62D 15/0225; B62D 5/0421; B62D 5/0448; B62D 5/0481; B62D 5/001; B62D 5/0424; B62D 5/0445; B62D 5/0463; B60Y 2304/07
See application file for complete search history.

(56) References Cited

U.S. PATENT DOCUMENTS

| | | | | |
|---|---|---|---|---|
| 2008/0146402 A1* | 6/2008 | Shinohara | ............... | F16H 55/06 |
| | | | | 475/331 |
| 2022/0266891 A1* | 8/2022 | Park | ..................... | B62D 5/0481 |
| 2022/0348250 A1* | 11/2022 | Jeon | ................... | B62D 15/0225 |
| 2023/0053581 A1* | 2/2023 | Jung | .................... | B62D 5/0427 |
| 2023/0219614 A1* | 7/2023 | Park | .................... | B62D 5/0424 |
| | | | | 180/443 |

FOREIGN PATENT DOCUMENTS

| | | |
|---|---|---|
| KR | 2009-0116183 | 11/2009 |
| KR | 1020200113706 | 10/2020 |
| KR | 1020210032638 | 3/2021 |

OTHER PUBLICATIONS

Korean Office Action dated Oct. 3, 2025 issued in KR 10-2021-0085523.

* cited by examiner

*Primary Examiner* — Minnah L Seoh
*Assistant Examiner* — Al-Birr Rahman Chowdhury
(74) *Attorney, Agent, or Firm* — DLA PIPER LLP US

(57) ABSTRACT

A steering actuator apparatus for a vehicle, may include: a housing, a drive part supported by the housing and configured to generate a rotational force, a transmission shaft part installed to be movable in the housing and configured to change a steering angle of a wheel while reciprocating by receiving the rotational force from the drive part, a measurement part configured to measure the steering angle of the wheel while operating in conjunction with a movement of the transmission shaft part, and a rotation prevention part disposed between the housing and the transmission shaft part and configured to prevent a relative rotation between the housing and the transmission shaft part.

13 Claims, 8 Drawing Sheets

STEERING ACTUATOR APPARATUS FOR VEHICLE

CROSS-REFERENCE TO RELATED APPLICATION

This application claims priority from and the benefit of Korean Patent Application No. 10-2021-0085523, filed on Jun. 30, 2021, which is hereby incorporated by reference for all purposes as if set forth herein.

BACKGROUND

Field

Exemplary embodiments of the present disclosure relate to a steering actuator apparatus for a vehicle, and more particularly, to a steering actuator apparatus for a vehicle, which is installed in a steer-by-wire (SBW) system.

Discussion of the Background

In general, a steer-by-wire (SBW) system refers to a steering system in which mechanical connection between a steering wheel and driving wheels of a vehicle is eliminated. The SBW system may steer the vehicle by receiving a rotation signal of the steering wheel through an electronic control unit (ECU) and operating a steering motor connected to the driving wheel on the basis of the received rotation signal. The SBW system does not have the mechanical connection of the steering system in the related art and thus has advantages in that a degree of layout freedom in respect to a configuration of the steering system may be increased, fuel economy may be improved, and disturbance reversely inputted from vehicle wheels may be eliminated. The SBW system includes a steering wheel configured to allow a driver to input a steering angle, a reaction force device configured to provide a reaction force to the driver, and a steering actuator configured to rotate a tire.

In a case in which a rack-driven steering actuator is applied to the SBW system, there is a need for a sensor configured to detect the steering angle of the wheel on the basis of a position of a rack bar. As a method of mounting the sensor, there are a method of attaching the sensor directly to the rack bar and a method of attaching the sensor to a separate component such as a pinion. A linear variable differential transformer (LVDT) sensor needs to be applied in the case in which the sensor is attached directly to the rack bar. However, the LVDT sensor needs to be increased in size to detect a rack stroke range of about 150 mm, which causes a problem in that the unit price of the sensor increases and mass production deteriorates.

According to the method of attaching the sensor to a separate component such as the pinion, an angle sensor, instead of a torque sensor, is mounted on an input pinion of an R-MDPS (EPS) in the related art. However, the structure of the input pinion in the related art requires heat treatment on a pinion and a rack bar, and has a large number of assembled components such as a clearance compensation structure. For this reason, there is a problem in that excessive costs are required.

The background technology of the present disclosure is disclosed in Korean Patent Application Laid-Open No. 10-2009-0116183 (published on Nov. 11, 2009 and entitled 'The Support York Structure of The Steering Apparatus for Vehicle').

SUMMARY

Various embodiments are directed to providing a steering actuator apparatus for a vehicle, which is capable of simplifying a coupling structure of a steering angle sensor and stably supporting a rack bar.

In an embodiment, a steering actuator apparatus for a vehicle includes: a housing; a drive part supported by the housing and configured to generate a rotational force; a transmission shaft part installed to be movable in the housing and configured to change a steering angle of a wheel while reciprocating by receiving the rotational force from the drive part; a measurement part configured to measure the steering angle of the wheel while operating in conjunction with a movement of the transmission shaft part; and a rotation prevention part disposed between the housing and the transmission shaft part and configured to prevent a relative rotation between the housing and the transmission shaft part.

In addition, the transmission shaft part may include: a ball screw configured to convert the rotational force generated from the drive part into a rectilinear motion; and a rack bar extending from the ball screw and configured to engage with the measurement part.

In addition, the drive part may include: a power generation unit configured to generate the rotational force; a control unit connected to the power generation unit and configured to control an operation of the power generation unit; and a power transmission unit configured to transmit the rotational force generated from the power generation unit to the transmission shaft part.

In addition, the power transmission unit may include: a speed reducer connected to the power generation unit and configured to amplify the rotational force generated from the power generation unit; and a ball nut coupled to the ball screw and configured to move the transmission shaft part by receiving the rotational force from the speed reducer.

In addition, the measurement part may include: a pinion configured to engage with the rack bar and rotate in conjunction with a movement of the rack bar; and a sensor unit coupled to the housing and configured to measure a rotation angle and a rotation direction of the pinion.

In addition, the pinion may be provided in the form of a spur gear.

In addition, the pinion may be manufactured by insert injection molding.

In addition, the rotation prevention part may include: a body portion disposed between the housing and the transmission shaft part; a first rotation prevention member protruding from an outer peripheral surface of the body portion and configured to be inserted into a first insertion portion concavely recessed in the housing; and a second rotation prevention member protruding from an inner peripheral surface of the body portion and configured to be inserted into a second insertion portion concavely recessed in the transmission shaft part.

In addition, the first rotation prevention member and the second rotation prevention member may be disposed on a circumference of the body portion and provided at opposite sides of the body portion based on a diameter of the body portion.

In addition, the second rotation prevention member may be provided as a pair of second rotation prevention members disposed to be spaced apart from each other at a preset interval in a circumferential direction of the body portion.

In addition, the preset interval at which the pair of the second rotation prevention members is spaced apart from each other may be 180 degrees or less.

In addition, the steering actuator apparatus may further include a movement prevention part disposed in the housing and configured to support the transmission shaft part.

In addition, the movement prevention part may include: a first movement prevention member having an outer peripheral surface press-fitted with an inner peripheral surface of the housing, and an inner peripheral surface adjoining the transmission shaft part; and a second movement prevention member having an outer peripheral surface press-fitted with an inner peripheral surface of the rotation prevention part, and an inner peripheral surface adjoining the transmission shaft part.

According to the steering actuator apparatus for a vehicle according to the present disclosure, the measurement part may be installed on the rack bar by using the simple structure without a separate component such as a clearance compensation structure, which makes it possible to implement an optimized package and reduce the number of assembly processes.

In addition, according to the steering actuator apparatus for a vehicle according to the present disclosure, the pinion may be provided in the form of a spur gear and manufactured by insert injection molding, which makes it possible to prevent the component of force applied to the pinion in the axial direction and reduce the costs required to manufacture the pinion.

According to the steering actuator apparatus for a vehicle according to the present disclosure, the rotation prevention part and the movement prevention part may prevent the transmission shaft part from rotating about a central axis thereof in the housing or being jammed in the housing, which makes it possible to improve quality of the product.

DETAILED DESCRIPTION OF THE ILLUSTRATED EMBODIMENTS

Figure 1:
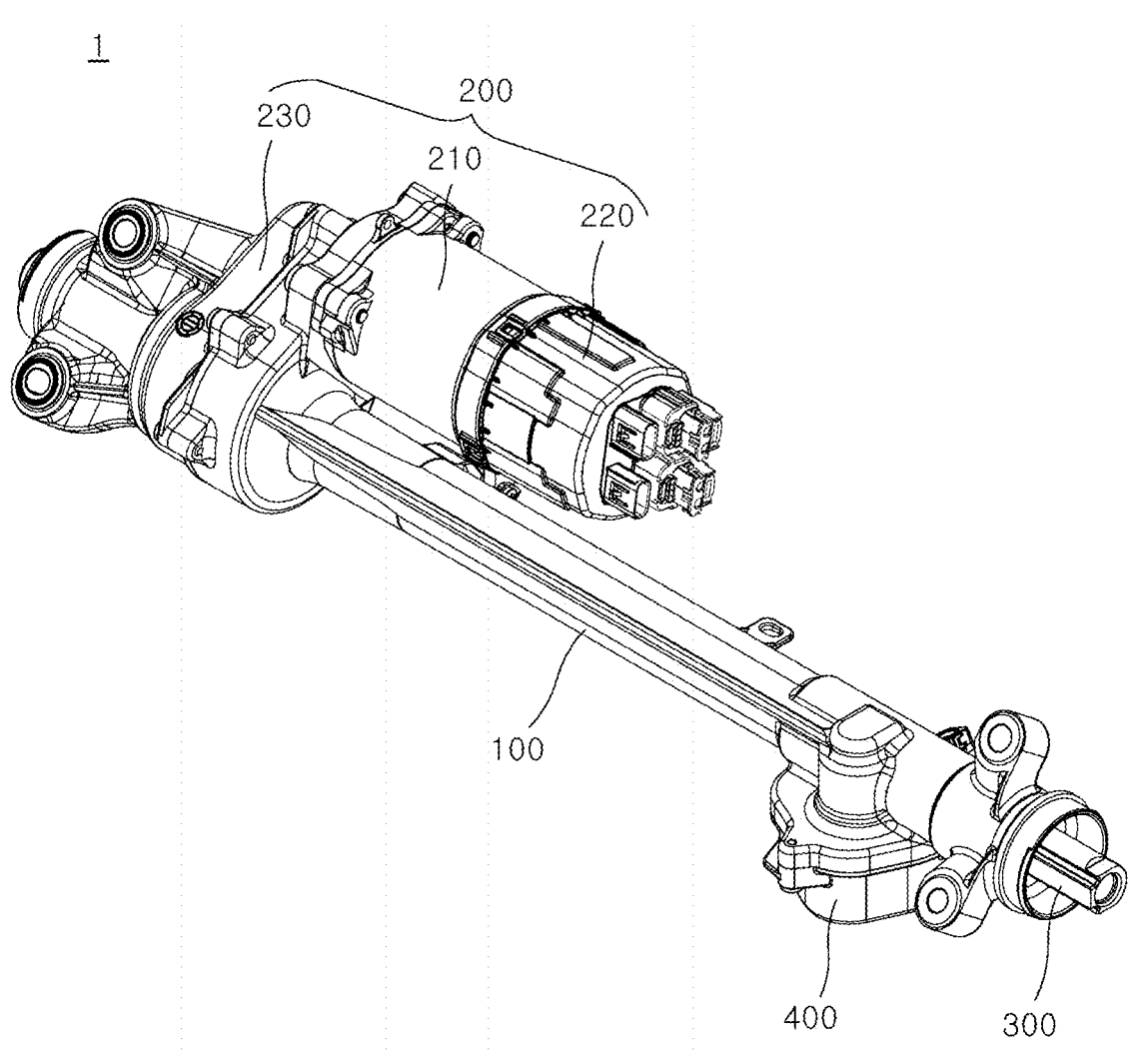
FIG. 1 is a perspective view schematically illustrating the configuration of a steering actuator apparatus for a vehicle according to an embodiment of the present disclosure.

Hereinafter, a steering actuator apparatus for a vehicle will be described below with reference to the accompanying drawings through various exemplary embodiments.

Here, thicknesses of lines, sizes of constituent elements, or the like illustrated in the drawings, may be exaggerated for clarity and convenience of description. In addition, the terms used below are defined in consideration of the functions thereof in the present disclosure and may vary depending on the intention of a user or an operator or a usual practice. Therefore, such terms should be defined based on the entire contents of the present specification.

In addition, in the present specification, when one constituent element is referred to as being "connected to (or coupled to)" another constituent element, the constituent elements can be "directly connected to (coupled to)" each other, and can also be "indirectly connected to (coupled to)" each other with other elements interposed therebetween. Unless explicitly described to the contrary, the word "comprise (or include)" and variations such as "comprises (or includes)" or "comprising (or including)" will be understood to imply the further inclusion of stated elements, not the exclusion of the stated elements.

In addition, throughout the specification, the same reference numerals denote the same constituent elements. Even though the same or similar reference numerals are not mentioned or described with reference to specific drawings, the same or similar reference numerals may be described with reference to the other drawings. In addition, even though there are parts denoted by no reference numeral in specific drawings, the parts may be described with reference to the other drawings. In addition, the numbers, shapes, sizes, relative differences in sizes, and the like of the detailed constituent elements illustrated in the drawings of the present application are set for convenience of understanding, do not limit the embodiments, and may be variously implemented.

Figure 2:
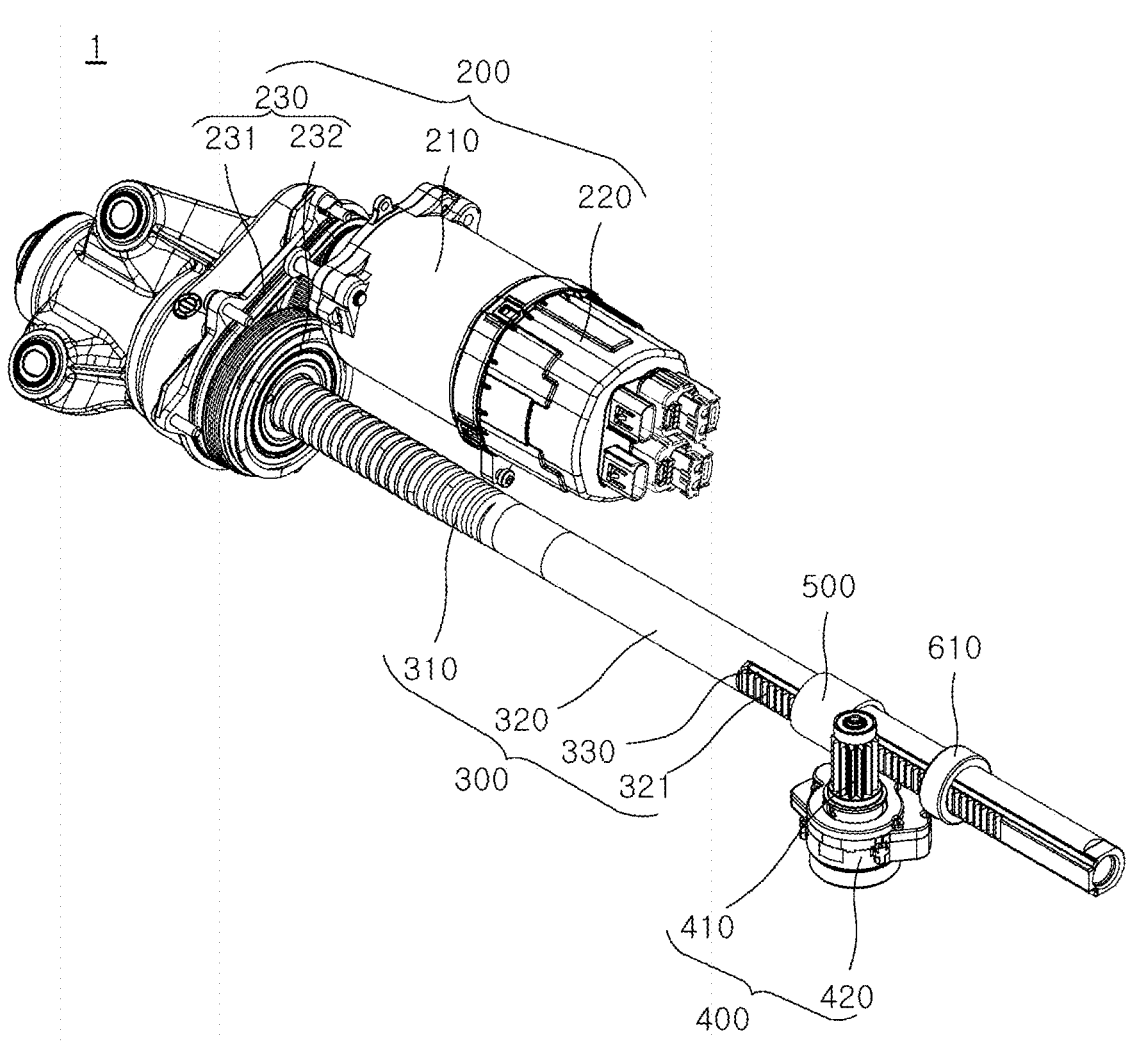
FIG. 2 is a perspective view schematically illustrating the configuration of the steering actuator apparatus for a vehicle according to the embodiment of the present disclosure from which a housing is removed.
Figure 3:
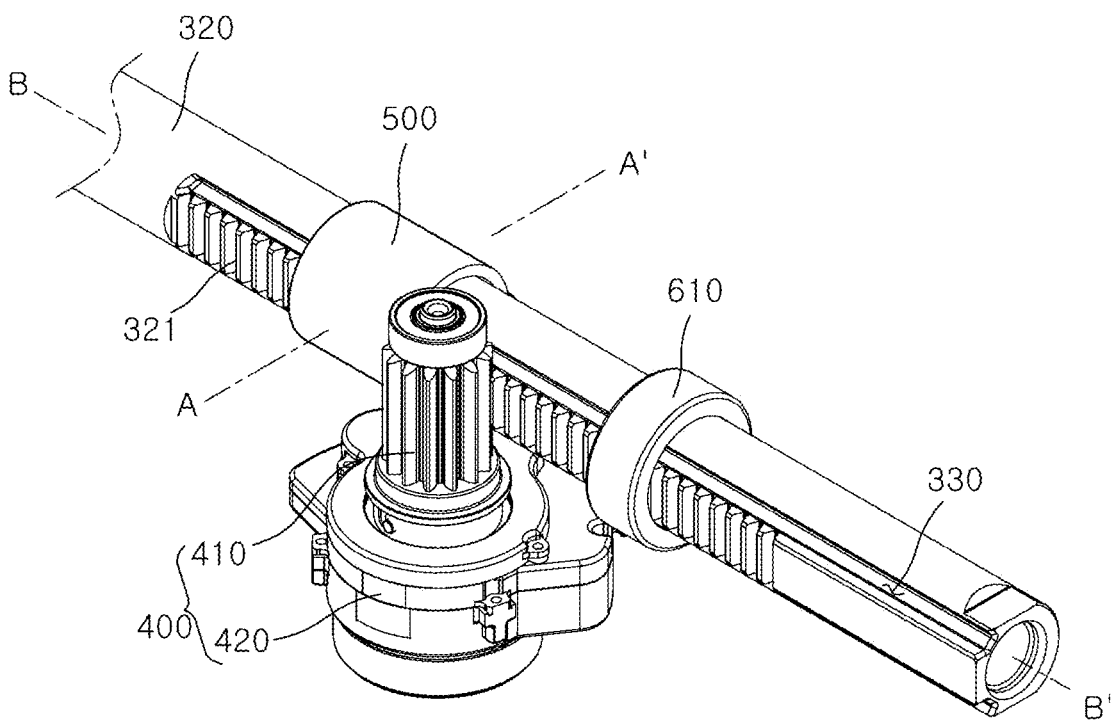
FIG. 3 is an enlarged perspective view schematically illustrating the configuration of the steering actuator apparatus for a vehicle according to the embodiment of the present disclosure.
Figure 4:
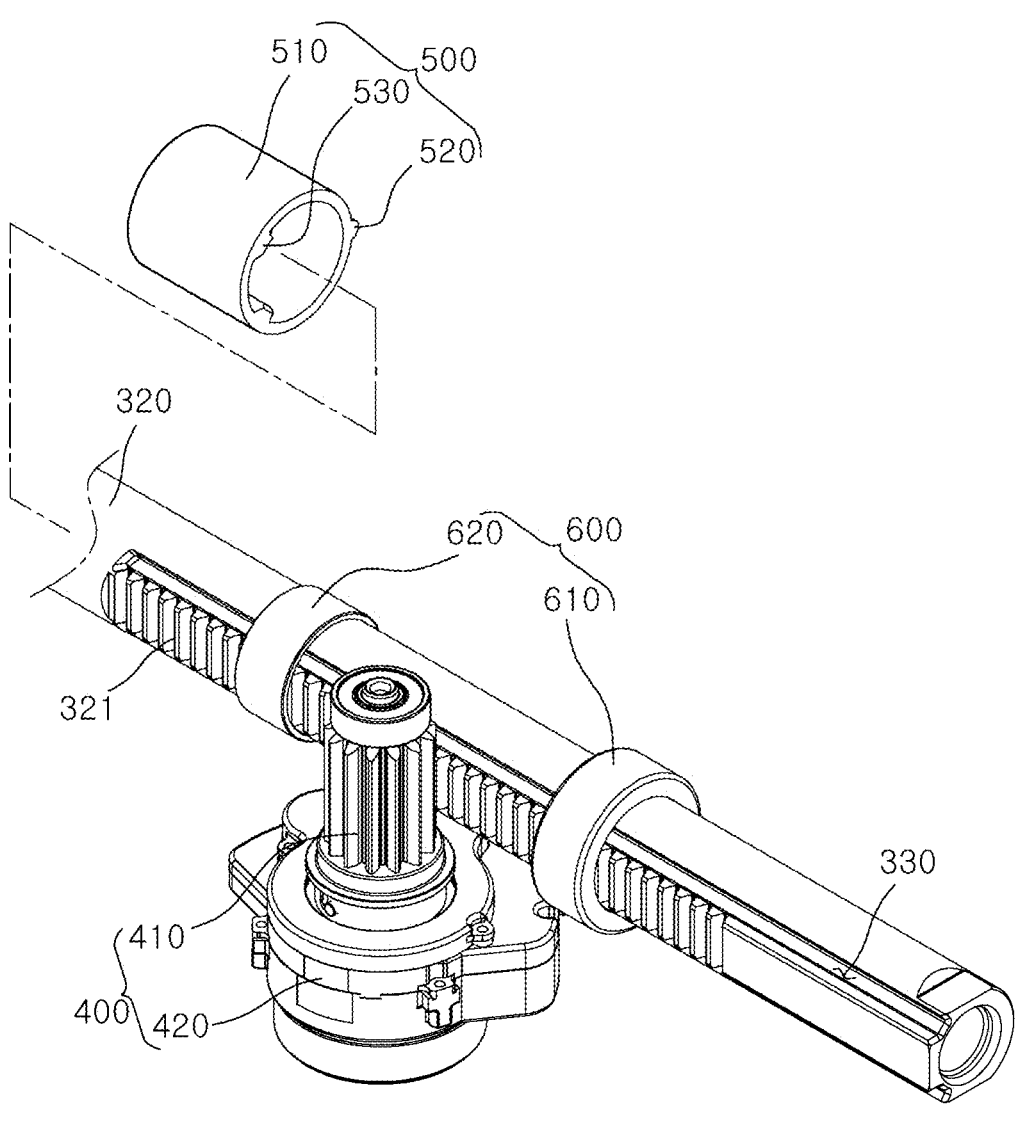
FIG. 4 is an exploded perspective view schematically illustrating the configuration of the steering actuator apparatus for a vehicle according to the embodiment of the present disclosure.
Figure 5:
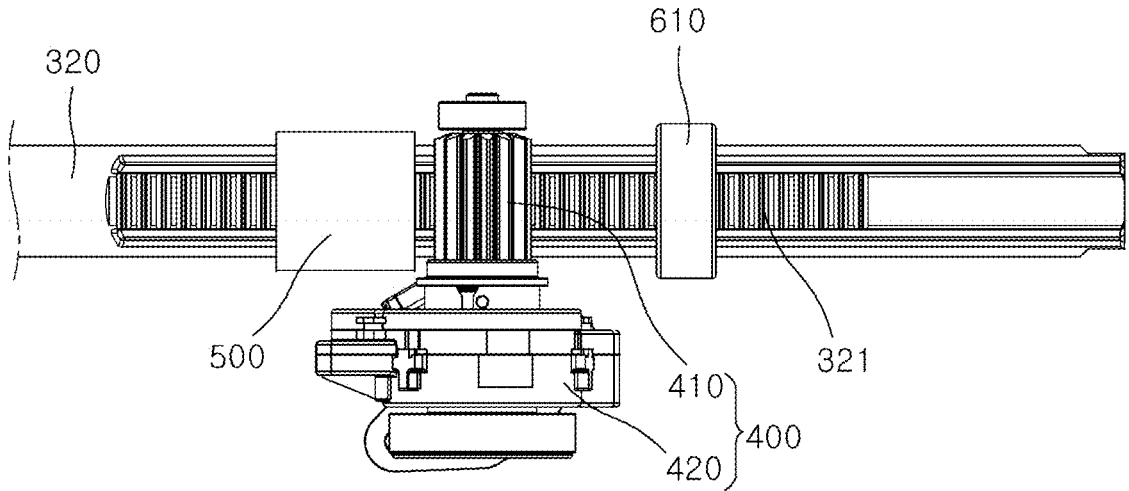
FIG. 5 is a front view schematically illustrating the configuration of the steering actuator apparatus for a vehicle according to the embodiment of the present disclosure.
Figure 6:
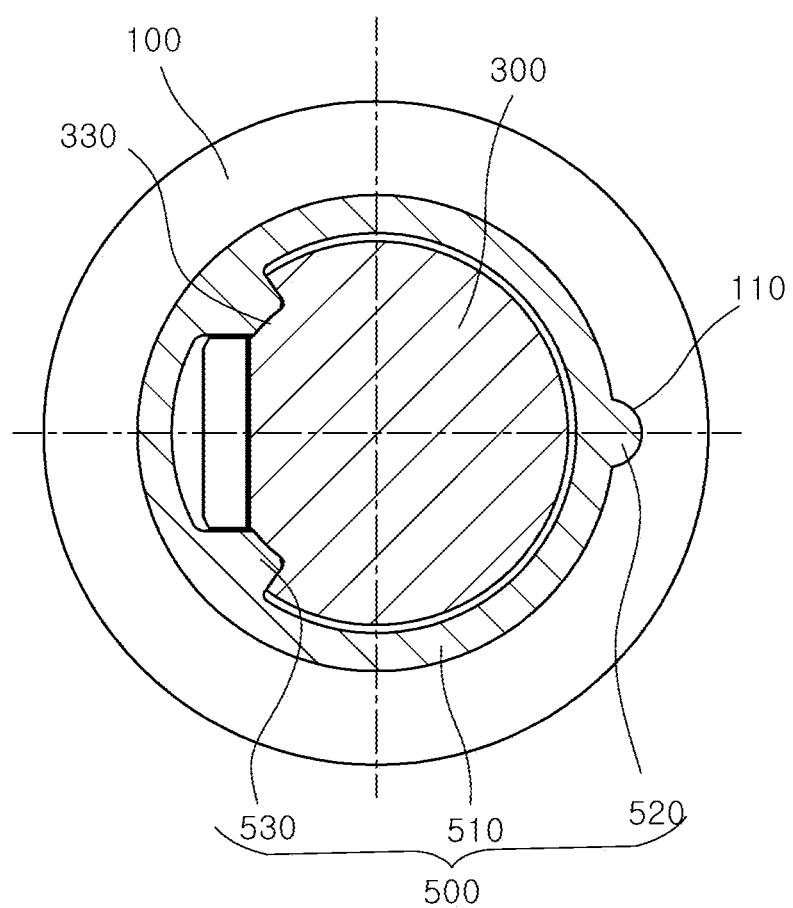
FIG. 6 is a cross-sectional view taken along line A-A' in FIG. 3.
Figure 7:
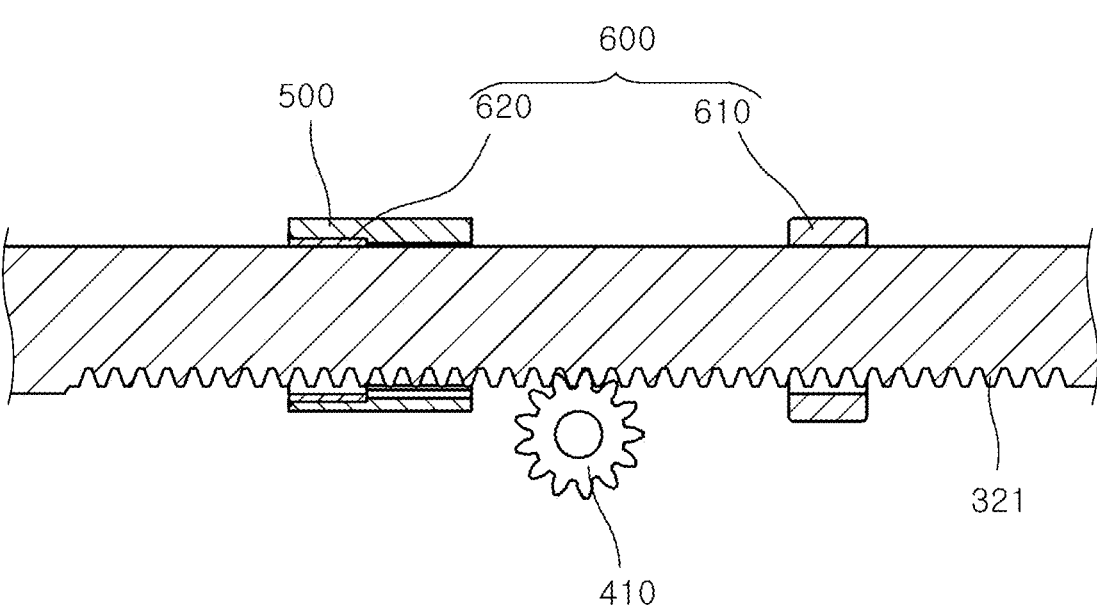
FIG. 7 is a cross-sectional view taken along line B-B' in FIG. 3.

FIG. 1 is a perspective view schematically illustrating the configuration of a steering actuator apparatus for a vehicle according to an embodiment of the present disclosure, FIG. 2 is a perspective view schematically illustrating the configuration of the steering actuator apparatus for a vehicle according to the embodiment of the present disclosure from which a housing is removed, FIG. 3 is an enlarged perspective view schematically illustrating the configuration of the steering actuator apparatus for a vehicle according to the embodiment of the present disclosure, FIG. 4 is an exploded perspective view schematically illustrating the configuration of the steering actuator apparatus for a vehicle according to the embodiment of the present disclosure, FIG. 5 is a front view schematically illustrating the configuration of the steering actuator apparatus for a vehicle according to the embodiment of the present disclosure, FIG. 6 is a cross-sectional view taken along line A-A' in FIG. 3, and FIG. 7 is a cross-sectional view taken along line B-B' in FIG. 3.

Referring to FIGS. 1 to 7, a steering actuator apparatus 1 for a vehicle according to an embodiment of the present disclosure includes a housing 100, a drive part 200, a transmission shaft part 300, a measurement part 400, a rotation prevention part 500, and a movement prevention part 600.

The housing 100 defines a schematic external appearance of the steering actuator apparatus 1 for a vehicle according to the embodiment of the present disclosure and supports the entire configuration including the drive part 200, the transmission shaft part 300, the measurement part 400, the rotation prevention part 500, and the movement prevention part 600 which will be described below. The housing 100 according to the embodiment of the present disclosure may have a hollow container shape having a vacant internal space. A longitudinal direction of the housing 100 is disposed in parallel with a width direction of a vehicle. The housing 100 may be fixed to and supported by a sub-frame (not illustrated) or the like installed at a lower side of the vehicle by bolting or the like. The specific shape of the housing 100 is not limited to the shape illustrated in FIG. 1. The housing 100 may be variously changed in design within the technical spirit in which the housing may support the entire configuration of the steering actuator apparatus 1 for a vehicle according to the embodiment of the present disclosure.

The housing 100 has a first insertion portion 110. The first insertion portion 110 according to the embodiment of the present disclosure may be provided in the form of a groove concavely recessed from an inner peripheral surface of the housing 100 toward an outer peripheral surface of the housing 100. A longitudinal direction of the first insertion portion 110 may be disposed in parallel with the longitudinal direction of the housing 100. A first rotation prevention member 520 of the rotation prevention part 500, which will be described below, is inserted into the first insertion portion 110. The cross-sectional shape and the extension length of the first insertion portion 110 may be variously changed in design depending on the shape of the first rotation prevention member 520 to be described below.

The drive part 200 is supported by the housing 100 and generates a rotational force to move the transmission shaft part 300 to be described below in the housing 100.

The drive part 200 according to the embodiment of the present disclosure includes a power generation unit 210, a control unit 220, and a power transmission unit 230.

The power generation unit 210 generates the rotational force by receiving electric power from the outside. The power generation unit 210 is fixed to the housing 100 and supports the entire configuration including the control unit 220 and the power transmission unit 230 which will be described below. For example, the power generation unit 210 according to the embodiment of the present disclosure may be configured as one of various types of electric motors, such as AC, DC, and BLDC motors, which convert electric power received from the outside into a rotational force. The power generation unit 210 may be fixed to the outer peripheral surface of the housing 100 by bolting, welding, and the like.

The control unit 220 is connected to the power generation unit 210 and controls an operation of the power generation unit 210 on the basis of a measured value measured by the measurement part 400 to be described below. For example, the control unit 220 according to the embodiment of the present disclosure may be configured as one of various types of electronic control units (ECUs) coupled to one side of the power generation unit 210 and being capable of controlling an overall operation of the power generation unit 210 such as a rotational speed of the power generation unit 210 and the rotation of the power generation unit 210.

The power transmission unit 230 is connected to the power generation unit 210 and the transmission shaft part 300 to be described below and transmits the rotational force generated from the power generation unit 210 to the transmission shaft part 300.

The power transmission unit 230 according to the embodiment of the present disclosure may include a speed reducer 231 and a ball nut 232.

The speed reducer 231 is connected to the power generation unit 210 and reduces the rotational speed of the power generation unit 210, thereby amplifying the rotational force to be transmitted to the ball nut 232 to be described below. The speed reducer 231 according to the embodiment of the present disclosure may include a driving pulley configured to rotate together with an output shaft of the power generation unit 210, a driven pulley connected to the ball nut 232, and a belt configured to surround the driving pulley and the driven pulley and rotate the driven pulley in conjunction with the rotation of the driving pulley.

The ball nut 232 moves the transmission shaft part 300 by receiving the rotational force from the speed reducer 231. The ball nut 232 according to the embodiment of the present disclosure may be provided in the form of a hollow ring disposed to surround an outer peripheral surface of the transmission shaft part 300. A screw thread is provided on an inner peripheral surface of the ball nut 232 and coupled to a ball screw 310 by means of a rolling element such as a ball, and the ball screw 310 is provided in the transmission shaft part 300. When the power generation unit 210 operates, the ball nut 232 rotates together with the driven pulley about a central axis of the transmission shaft part 300.

The specific shape of the power transmission unit 230 is not limited to the shape illustrated in FIGS. 1 and 2. The power transmission unit 230 may be variously changed in design within the technical spirit in which the power transmission unit 230 may transmit the rotational force generated from the power generation unit 210 to the transmission shaft part 300.

The transmission shaft part 300 is installed in the housing 100 and movable in a direction parallel to the longitudinal direction of the housing 100. Two opposite ends of the transmission shaft part 300 are respectively connected to a pair of tie rods (not illustrated) connected to vehicle wheels. The transmission shaft part 300 reciprocates in the housing 100 by receiving the rotational force from the drive part 200. The transmission shaft part 300 transmits a force to the tie rods connected to the two opposite ends thereof while reciprocating in the housing 100, thereby changing a steering angle of the wheels.

The transmission shaft part 300 according to the embodiment of the present disclosure includes the ball screw 310, a rack bar 320, second insertion portions 330.

The ball screw 310 defines an external appearance of one side of the transmission shaft part 300. The ball screw 310 is connected to the drive part 200 and converts the rotational force generated from the drive part 200 into a rectilinear motion. Therefore, the ball screw 310 may allow the transmission shaft part 300 to rectilinearly reciprocate in the housing 100. The ball screw 310 according to the embodiment of the present disclosure may be provided in the form of a rod having a screw thread formed on an outer peripheral surface thereof. A longitudinal direction of the ball screw 310 is disposed in parallel with the longitudinal direction of the housing 100. The outer peripheral surface of the ball screw 310 is coupled to the inner peripheral surface of the ball nut 232 by means of the rolling element such as a ball.

The rack bar 320 extends from the ball screw 310 and defines an external appearance of the other side of the transmission shaft part 300. The rack bar 320 according to the embodiment of the present disclosure may be provided in the form of a rod extending from one end (right end based on FIG. 3) of the ball screw 310 in a direction parallel to the longitudinal direction of the ball screw 310. The rack bar 320 may be integrated with the ball screw 310 or manufactured separately from the ball screw 310 and then coupled to the ball screw 310. A rack gear 321 is formed on a lateral surface of the rack bar 320 and disposed in the longitudinal direction of the rack bar 320. The rack gear 321 may be provided in the form of a steel gear which is not subjected to the heat treatment. The rack gear 321 engages with a pinion 410 of the measurement part 400 to be described below.

The second insertion portion 330 according to the embodiment of the present disclosure may be provided in the form of a groove concavely recessed from an outer peripheral surface of the rack bar 320 toward the inside of the rack bar 320. A longitudinal direction of the second insertion portion 330 extends in a direction parallel to the longitudinal direction of the rack bar 320. The second insertion portion 330 is provided as a pair of second insertion portions 330 respectively disposed at two opposite sides of the rack gear 321 based on an upward/downward direction (based on FIG. 3). Second rotation prevention members 530 of the rotation prevention part 500 to be described below are inserted into the second insertion portions 330. The cross-sectional shape and the extension length of the second insertion portion 330 may be variously changed in design depending on the shape of the second rotation prevention member 530 to be described below.

The measurement part 400 measures the steering angle of the wheel while operating in conjunction with the movement of the transmission shaft part 300. More specifically, the measurement part 400 indirectly measures the steering angle of the wheel on the basis of a movement direction and a movement distance of the transmission shaft part 300 in the housing 100. The measurement part 400 is connected to the control unit 220 in a wireless or wired manner and transmits measurement data to the control unit 220.

The measurement part 400 according to the embodiment of the present disclosure includes the pinion 410 and a sensor unit 420.

The pinion 410 engages with the rack bar 320 and rotates in conjunction with the movement of the rack bar 320. The pinion 410 according to the embodiment of the present disclosure may be provided in the form of a spur gear. A central axis of the pinion 410 is disposed in a direction perpendicular to the longitudinal direction of the transmission shaft part 300. Therefore, no component of force in an axial direction may be applied to the pinion 410. The pinion 410 may be made of a plastic material. In this case, the pinion 410 may be manufactured by insert injection molding. Therefore, the pinion 410 may be easily manufactured, and the costs required to manufacture the pinion 410 may be reduced. An outer peripheral surface of the pinion 410 engages with the rack gear 321. When the transmission shaft part 300 moves, the pinion 410 is rotated clockwise or counterclockwise about a central axis thereof by the rack gear 321 engaging with the pinion 410.

The sensor unit 420 is coupled to the housing 100 and supports the pinion 410 so that the pinion 410 is rotatable. The sensor unit 420 serves to measure a rotation angle and a rotation direction of the pinion 410 rotated by the rack bar 320. The sensor unit 420 is connected to the control unit 220 in a wireless or wired manner and transmits measurement data to the control unit 220. The sensor unit 420 according to the embodiment of the present disclosure may include a casing fixed to the outer peripheral surface of the housing 100 by bolting, welding, and the like and configured to support the pinion 410 so that the pinion 410 is rotatable, and various types of rotation angle sensors embedded in the casing and configured to measure the rotation angle and the rotation direction of the pinion 410.

The rotation prevention part 500 is disposed between the housing 100 and the transmission shaft part 300 and configured to prevent a relative rotation between the housing 100 and the transmission shaft part 300. More specifically, the rotation prevention part 500 allows the reciprocation of the transmission shaft part 300 in the longitudinal direction of the housing 100 and prevents the transmission shaft part 300 from rotating about the central axis thereof in the housing 100. Therefore, the rotation prevention part 500 may prevent the rotation of the transmission shaft part 300 about the central axis thereof in the housing 100 that may occur because the pinion 410 and the rack gear 321 are provided in the form of the spur gears.

Figure 8:
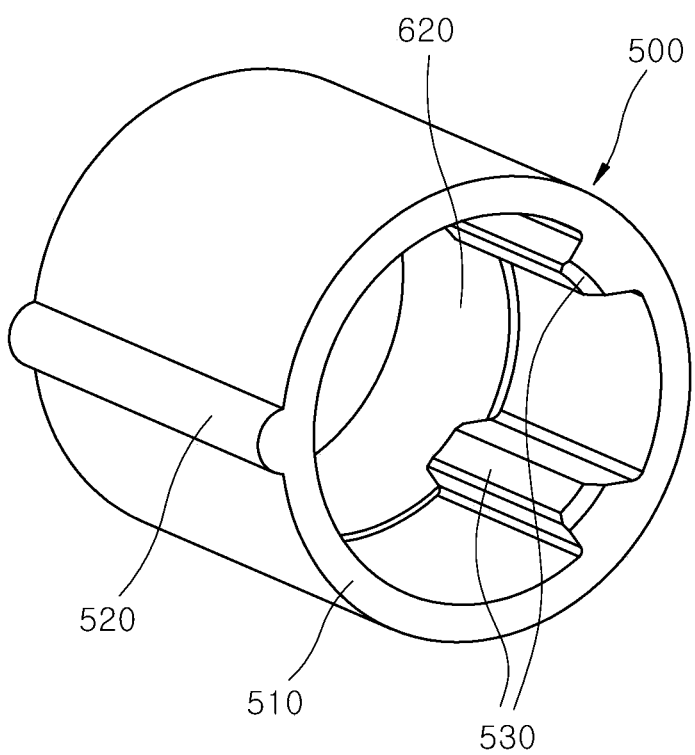
FIG. 8 is a perspective view schematically illustrating the configuration of a rotation prevention part according to the embodiment of the present disclosure.

FIG. 8 is a perspective view schematically illustrating the configuration of the rotation prevention part according to the embodiment of the present disclosure.

Referring to FIGS. 1 to 8, the rotation prevention part 500 according to the embodiment of the present disclosure includes a body portion 510, the first rotation prevention member 520, and the second rotation prevention members 530.

The body portion 510 is disposed between the housing 100 and the transmission shaft part 300. The body portion 510 according to the embodiment of the present disclosure may be provided in the form of a hollow ring inserted into a space between the housing 100 and the transmission shaft part 300. An outer peripheral surface of the body portion 510 is disposed to face the inner peripheral surface of the housing 100. An inner peripheral surface of the body portion 510 is disposed to face the outer peripheral surface of the rack bar 320, more specifically, face the rack gear 321.

The first rotation prevention member 520 is provided in the form of a protrusion protruding from an outer peripheral surface of the body portion 510 toward the inner peripheral surface of the housing 100. The first rotation prevention member 520 is inserted into the first insertion portion 110 concavely recessed in the housing 100. The first rotation prevention member 520 is caught by the first insertion portion 110, thereby preventing a relative rotation between the body portion 510 and the housing 100. The specific shape of the first rotation prevention member 520 is not limited to the shape illustrated in FIG. 6. The first rotation prevention member 520 may be variously changed in design within the technical spirit in which the first rotation prevention member 520 may prevent a relative rotation between the body portion 510 and the housing 100.

The second rotation prevention member 530 is provided in the form of a protrusion protruding from an inner peripheral surface of the body portion 510 toward the outer peripheral surface of the transmission shaft part 300. The second rotation prevention member 530 is inserted into the second insertion portion 330 concavely recessed in the transmission shaft part 300. The second rotation prevention member 530 is caught by the second insertion portion 330, thereby preventing a relative rotation between the body portion 510 and the transmission shaft part 300.

The second rotation prevention members 530 may be disposed on a circumference of the body portion 510 and provided at a side of the body portion 510 opposite to the first rotation prevention member 520 based on any one diameter of the body portion 510. In this case, any one diameter of the body portion 510 may be a diameter disposed in a direction perpendicular to the longitudinal direction of the transmission shaft part 300, for example. The second rotation prevention member 530 may be provided as a pair of second rotation prevention members 530. The pair of second rotation prevention members 530 is disposed to be spaced apart from each other at a preset interval in a circumferential direction of the body portion 510. In this case, the preset interval at which the pair of second rotation prevention members 530 is spaced apart from each other may be 180 degrees or less. Therefore, the second rotation prevention members 530, together with the first rotation prevention member 520, may uniformly support two peripheral opposite sides of the transmission shaft part 300 and prevent the rotational moment of force applied to the transmission shaft part 300 from being concentrated on any one point on the body portion 510.

The movement prevention part 600 is disposed in the housing 100 and supports the transmission shaft part 300. More specifically, the movement prevention part 600 prevents the transmission shaft part 300 from separating from an exact position and moving in the housing 100 in a radial direction of the housing 100. Therefore, the movement prevention part 600 may prevent the transmission shaft part 300 from being jammed on an inner wall of the housing 100 or colliding with the inner wall of the housing 100 because of sagging of the transmission shaft part 300.

The movement prevention part 600 according to the embodiment of the present disclosure includes a first movement prevention part 610 and a second movement prevention part 620.

The first movement prevention part 610 is provided in the form of a hollow ring and inserted between the inner peripheral surface of the housing 100 and the outer peripheral surface of the transmission shaft part 300. The first movement prevention part 610 is disposed at one side (right side based on FIG. 3) based on the measurement part 400. An outer peripheral surface of the first movement prevention part 610 is press-fitted with and fixed to the inner peripheral surface of the housing 100. An inner peripheral surface of the first movement prevention part 610 adjoins the transmission shaft part 300, more specifically, the outer peripheral surface of the rack bar 320 on which the rack gear 321 is formed. The inner peripheral surface of the first movement prevention part 610 may be made of a material having a low frictional coefficient so that the inner peripheral surface of the first movement prevention part 610 stably supports the transmission shaft part 300 but does not excessively interfere with the movement of the transmission shaft part 300.

The second movement prevention part 620 is provided in the form of a hollow ring and inserted between the inner peripheral surface of the rotation prevention part 500 and the outer peripheral surface of the transmission shaft part 300. The second movement prevention part 620 is disposed to be spaced apart from the first movement prevention part 610 in the longitudinal direction of the transmission shaft part 300. The second movement prevention part 620 is disposed at the other side (left side based on FIG. 3) based on the measurement part 400. An outer peripheral surface of the second movement prevention part 620 is press-fitted with and fixed to the inner peripheral surface of the rotation prevention part 500. An inner peripheral surface of the second movement prevention part 620 adjoins the transmission shaft part 300, more specifically, the outer peripheral surface of the rack bar 320 on which the rack gear 321 is formed. The inner peripheral surface of the second movement prevention part 620 may be made of a material having a low frictional coefficient so that the inner peripheral surface of the second movement prevention part 620 stably supports the transmission shaft part 300 but does not excessively interfere with the movement of the transmission shaft part 300.

While the present disclosure has been described with reference to the exemplary embodiment depicted in the drawings, the exemplary embodiment is described just for illustration, and those skilled in the art to the present technology pertains will understand that various modifications of the exemplary embodiment and any other exemplary embodiment equivalent thereto are available.

Accordingly, the technical protection scope of the present disclosure should be determined by the appended claims.

What is claimed is:

1. A steering actuator apparatus for a vehicle, comprising:
a housing;
a drive part supported by the housing and configured to generate a rotational force;
a transmission shaft part installed to be movable in the housing and configured to change a steering angle of a wheel by receiving the rotational force from the drive part;
a measurement part configured to measure the steering angle of the wheel while operating in conjunction with a movement of the transmission shaft part; and
a rotation prevention part disposed between the housing and the transmission shaft part and configured to prevent a rotation between the housing and the transmission shaft part, wherein the rotation prevention part comprises:
a body portion disposed between the housing and the transmission shaft part;
a first rotation prevention member protruding from an outer peripheral surface of the body portion and configured to be inserted into a first insertion portion recessed in the housing; and
a second rotation prevention member protruding from an inner peripheral surface of the body portion and configured to be inserted into a second insertion portion recessed in the transmission shaft part.

2. The steering actuator apparatus of claim 1, wherein the transmission shaft part comprises:
a ball screw configured to convert the rotational force generated from the drive part into a rectilinear motion; and
a rack bar extending from the ball screw and configured to engage with the measurement part.

3. The steering actuator apparatus of claim 2, wherein the drive part comprises:
a power generation unit configured to generate the rotational force;
a control unit connected to the power generation unit and configured to control an operation of the power generation unit; and
a power transmission unit configured to transmit the rotational force generated from the power generation unit to the transmission shaft part.

4. The steering actuator apparatus of claim 3, wherein the power transmission unit comprises:
a speed reducer connected to the power generation unit and configured to amplify the rotational force generated from the power generation unit; and
a ball nut coupled to the ball screw and configured to move the transmission shaft part by receiving the rotational force from the speed reducer.

5. The steering actuator apparatus of claim 2, wherein the measurement part comprises:
a pinion configured to engage the rack bar and rotate in conjunction with a movement of the rack bar; and
a sensor unit coupled to the housing and configured to measure a rotation angle and a rotation direction of the pinion.

6. The steering actuator apparatus of claim 5, wherein the pinion comprises a spur gear.

7. The steering actuator apparatus of claim 5, wherein the pinion is insert injection molded.

8. The steering actuator apparatus of claim 1, wherein the first rotation prevention member and the second rotation prevention member are disposed on a circumference of the body portion and provided at opposite sides of a center of the body portion along a diameter of the body portion.

9. The steering actuator apparatus of claim 1, wherein the second rotation prevention member comprises a pair of second rotation prevention members configured to be spaced apart from each other at a preset interval in a circumferential direction of the body portion.

10. The steering actuator apparatus of claim 9, wherein the preset interval is 180 degrees or less.

11. The steering actuator apparatus of claim 1, further comprising:

a movement prevention part disposed in the housing and configured to support the transmission shaft part.

12. The steering actuator apparatus of claim 11, wherein the movement prevention part comprises:

a first movement prevention member having:

an outer peripheral surface press-fit with an inner peripheral surface of the housing, and an inner peripheral surface adjoining the transmission shaft part; and a second movement prevention member having:

an outer peripheral surface press-fit with an inner peripheral surface of the rotation prevention part, and an inner peripheral surface adjoining the transmission shaft part.

13. A steering actuator apparatus for a vehicle, comprising:

a housing;

a drive part supported by the housing and configured to generate a rotational force;

a transmission shaft part installed to be movable in the housing and configured to change a steering angle of a wheel by receiving the rotational force from the drive part;

a measurement part configured to measure the steering angle of the wheel while operating in conjunction with a movement of the transmission shaft part;

a rotation prevention part disposed between the housing and the transmission shaft part and configured to prevent a rotation between the housing and the transmission shaft part;

a movement prevention part disposed in the housing and configured to support the transmission shaft part, wherein the movement prevention part comprises:

a first movement prevention member having:

an outer peripheral surface press-fit with an inner peripheral surface of the housing, and an inner peripheral surface adjoining the transmission shaft part; and a second movement prevention member having:

an outer peripheral surface press-fit with an inner peripheral surface of the rotation prevention part, and an inner peripheral surface adjoining the transmission shaft part.

* * * * *